United States Patent [19]

Fujii

[11] 4,315,669
[45] Feb. 16, 1982

[54] WIDE-ANGLE ZOOM LENS SYSTEM

[75] Inventor: Toru Fujii, Hino, Japan

[73] Assignee: Olympus Optical Co., Ltd., Tokyo, Japan

[21] Appl. No.: 119,848

[22] Filed: Feb. 8, 1980

[30] Foreign Application Priority Data

Feb. 23, 1979 [JP] Japan .................................. 54-20313

[51] Int. Cl.³ ............................................. G02B 15/16
[52] U.S. Cl. .................................................... 350/426
[58] Field of Search .................................. 350/426, 458

[56] References Cited

U.S. PATENT DOCUMENTS

3,848,969 11/1974 Tajima ................................. 350/426

FOREIGN PATENT DOCUMENTS

2758688 7/1978 Fed. Rep. of Germany ...... 350/426

*Primary Examiner*—John K. Corbin
*Assistant Examiner*—Scott J. Sugarman
*Attorney, Agent, or Firm*—Cushman, Darby & Cushman

[57] ABSTRACT

A wide-angle zoom lens system consisting of a front lens group, a rear lens group and an aperture stop arranged therebetween, said front lens group comprising a first positive meniscus lens element having a convex surface on the object side, a second negative meniscus lens element having a strongly concave surface on the image side, a third positive meniscus lens element having a concave surface on the object side, a fourth biconcave lens element and a fifth biconvex lens element, and said rear lens group comprising a sixth biconvex lens element, a seventh positive meniscus lens element, an eighth positive meniscus lens element, a ninth biconcave lens element, a tenth negative meniscus lens element having a concave surface on the image side and an eleventh biconvex lens element. Said zoom lens system is so adapted as to permit changing forcal length of the entire lens system by changing the airspace reserved between said front and rear lens groups.

3 Claims, 7 Drawing Figures f = 1 f = 1.3798 f = 1.89

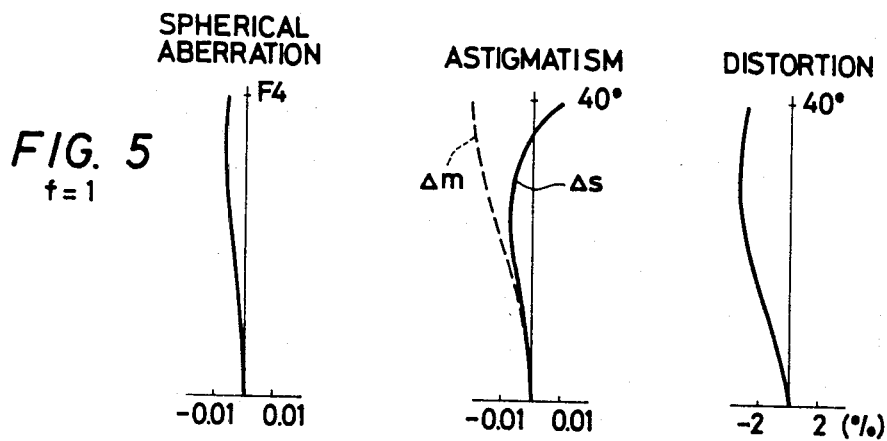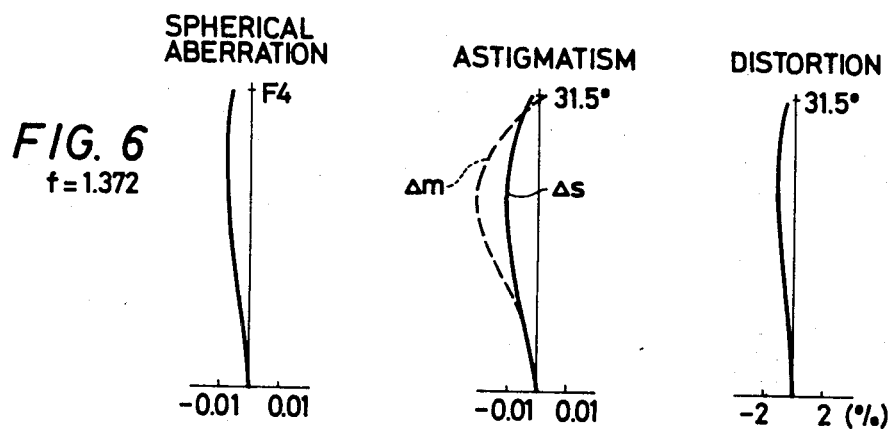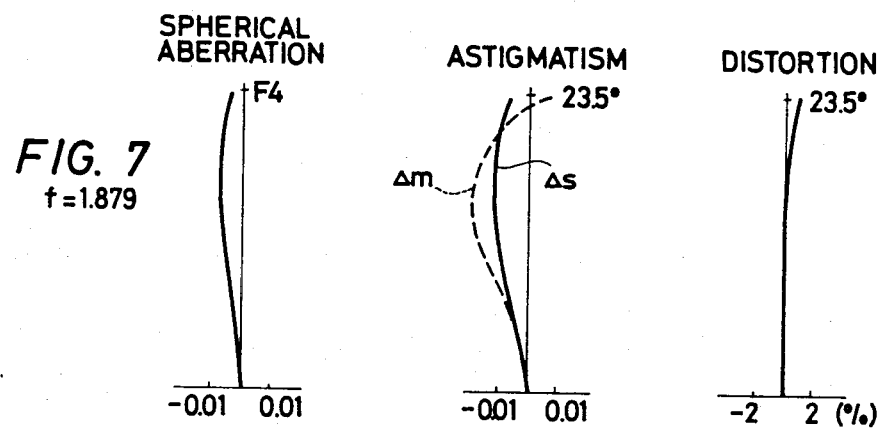

WIDE-ANGLE ZOOM LENS SYSTEM

BACKGROUND OF THE INVENTION (a) Field of the Invention

The present invention relates to a retrofocus type of compact wide-angle zoom lens system consisting of a front lens group having negative refractive power and a rear lens group having positive refractive power.

(b) Description of the Prior Art

In a retrofocus type of zoom lens system, it is general to arrange an aperture stop within its rear lens group. The reason for this arrangement is to facilitate correction of distortion caused in the rear lens group by selecting the above-mentioned compositions. However, this arrangement results in displacing position of the entrance pupil backward for the front lens group, thereby enlarging the effective diameter of the frontmost lens element unavoidably and prolonging the total length of the lens system as a whole. For example, there is a conventional zoom lens system which has a sufficiently large field angle of 84° at the wide position. However, this zoom lens system is not compact since the first lens element has a large effective diameter and the entire lens system has a large total length. Further, remarkable aberration remains at the wide position of this lens system.

There is another type of the conventional zoom lens system which is compact as a whole but has an unsatisfactory field angle as small as 62° at its wide position. If the field angle is enlarged to about 80° without changing substantially the composition of this lens system, aberrations, especially distortion will be remarkably aggravated.

It has thus been difficult for the conventional zoom lens system to satisfy all the requirements at the same time, i.e., to enlarge field angle to about 80°, correct aberrations favorably, design entire lens system compact as a whole and minimize effective diameter of first lens element. Therefore, the conventional wide-angle zoom lens systems, etc. have drawbacks that they are incompatible with filters having a diameter of 55 mm which are generally used with standard lens systems and must be combined with filters having a large diameter of 72 mm.

SUMMARY OF THE INVENTION

A general object of the present invention is to provide a wide-angle zoom lens system which can satisfy the above-mentioned requirements at the same time, i.e., having a field angle of 80° at the wide position, designed compact as a whole, comprising a first lens element having a small effective diameter, being compatible with ordinary filters having a diameter of 55 mm and assuring favorable correction of various aberrations.

The zoom lens system according to the present invention is a retrofocus type wide-angle lens system comprising a front lens group having negative refractive power and a rear lens group having positive refractive power, and permitting to change focal length of the entire lens system by varying the airspace reserved between said front and rear lens groups. The zoom lens system according to the present invention has such a composition as shown in FIG. 1, i.e., said front lens group comprises a first positive meniscus lens element having a convex surface on the object side, a second negative meniscus lens element having a strongly concave surface on the image side, a third positive meniscus lens element having a concave surface on the object side, a fourth biconcave lens element and a fifth biconvex lens element, whereas said rear lens group comprising a sixth biconvex lens element, a seventh positive meniscus lens element, an eighth positive meniscus lens element, a ninth biconcave lens element, a tenth negative meniscus lens element having a concave surface on the image side and an eleventh biconvex lens element.

The wide-angle zoom lens system according to the present invention has such a construction that an aperture stop is arranged in the airspace reserved between said front and rear lens groups, and can be displaced together with said rear lens group for zooming. Owing to this construction, the present invention has succeeded in correcting negative distortion caused in the rear lens group by arranging two negative lens elements in said rear lens group while minimizing effective diameter of the first lens element. When the aperture stop is arranged as described above, it is possible to control distortion at a relatively low level in the front lens group. Further, in order to minimize the effective diameter of the first lens element and shorten total length of the lens system as a whole, it is effective to shorten total length of the front lens group. When it is attempted to arrange the aperture stop as described above and shorten total length of the front lens group at the same time, however, it is difficult to correct negative distortion produced in the front lens group. In order to solve this problem, it is practiced to arrange a positive lens element at a rear position within the front lens group and select a negative radius of curvature for the image side surface of said lens element so as to correct the negative distortion produced in the front lens group.

In a zoom lens system comprising a positive lens element arranged as described above, slight astigmatism is produced by said lens surface having the negative radius of curvature. The inventor has discovered that such astigmatism can be corrected very effectively by selecting a negative radius of curvature for the object side surface of the third lens element.

The present invention has succeeded in achieving a wide-angle zoom lens system which is compact and at the same time has high performance by designing it so as to satisfy the following conditions while taking the above requirements into consideration:

$$2.5 < |f_1/f_F| < 5.0 \tag{1}$$

$$0.7 < |f_2/f_F| < 0.8 \tag{2}$$

$$0.8 < |f_5/f_F| < 0.95 \tag{3}$$

$$n_4 - n_3 > 0.13 \tag{4}$$

$$r_5 < 0 \tag{5}$$

$$0.4 < f_{678}/f_R < 0.6 \tag{6}$$
$$0.4 < |f_9/f_R| < 0.7 \tag{7}$$

$$1.3 < |f_{10}/f_R| < 1.7 \tag{8}$$

wherein the reference symbols are as defined below:

$f_1$, $f_2$, $f_5$, $f_9$ and $f_{10}$: focal lengths of the first, second, fifth, ninth and tenth lens elements respectively $f_{678}$: total focal length of the sixth, seventh and eighth lens elements as a whole $n_3$ and $n_4$: refractive indices of the third and fourth lens elements respectively $r_5$: radius of curvature on the object side surface of the third lens element $f_F$: focal length of the front lens group as a whole $f_R$: focal length of the rear lens group as a whole Now, significance of the conditions will be described consecutively below:

If $|f_1/f_F|$ is smaller than the lower limit of the condition (1), negative curvature of field will be aggravated. If $|f_1/f_F|$ exceeds the upper limit of the condition (1), in contrast, it will be difficult to correct negative distortion produced by the second and third lens elements.

The condition (2) relates to refractive power of the second lens element which has main refractive power among the lens elements arranged in the front lens group. If $|f_2/f_F|$ is smaller than the lower limit of the condition (2), coma will be aggravated over the entire zooming range. If $|f_2/f_F|$ exceeds the upper limit of the condition (2), in contrast, it is required to increase refractive power of the fourth lens element in order to maintain the negative refractive power of the front lens group at a constant level. However, increase in the refractive power of the fourth lens element will shift the principal point of the front lens group rearward to widen the airspace reserved between the front and rear lens groups at the tele position of the zoom lens system, thereby unavoidably prolonging total length of the entire lens system and enlarging effective length of the first lens element.

If $|f_5/f_F|$ is smaller than the lower limit of the condition (3), astigmatic difference will be increased. If $|f_5/f_F|$ exceeds the upper limit of the condition (3), in contrast, spherical aberration will be overcorrected especially at the tele position.

The condition (4) relates especially to coma at the tele position. If $n_4-n_3$ is smaller than the lower limit of the condition (3), coma flare will be aggravated at wide angles of field when the zoom lens system is set at its tele position.

The condition (5) relates to curvature of field especially in the meridiomal direction. If $r_5$ is larger than 0, there will be produced curvature of field which is negative for rays at small angles of field and positive for rays at large angles of field, thereby degrading flatness of the image plane in the meridional direction. In addition, $r_5>0$ will allow too little positive distortion to be produced by the object side surface of the third lens element, thereby resulting in aggravated distortion in the entire lens system especially at the wide position.

The condition (6) is required for correcting spherical aberration in the rear lens group and shortening total length of the lens system as a whole. If $f_{678}/f_R$ is smaller than the lower limit of the condition (6), back focal length will be too short and, at the same time, spherical aberration will be undercorrected especially at the wide position. If $f_{678}/f_R$ exceeds the upper limit of the condition (6), in contrast, the principal point of the rear lens group will be displaced rearward, thereby making it necessary to prolong focal length of the rear lens group and therefore increase total length of the entire lens system.

The conditions (7) and (8) relates to correction of distortion and spherical aberration produced in the rear lens group. If the upper limits of the conditions (7) and (8) are exceeded, spherical aberration will be undercorrected so long as the condition (6) is satisfied. If $|f_9/f_R|$ is smaller than the lower limit of the condition (7), spherical aberration will be overcorrected especially at the tele position though distortion will be corrected advantageously. If $|f_{10}/f_R|$ is smaller than the lower limit of the condition (8), coma will unavoidably be aggravated for the upper rays especially at the tele position.

BRIEF DESCRIPTION OF THE DRAWINGS

FIG. 5 through FIG. 7 show curves illustrating the aberration characteristics of a second embodiment of the present invention.

DESCRIPTION OF THE PREFERRED EMBODIMENT

Figure 1:
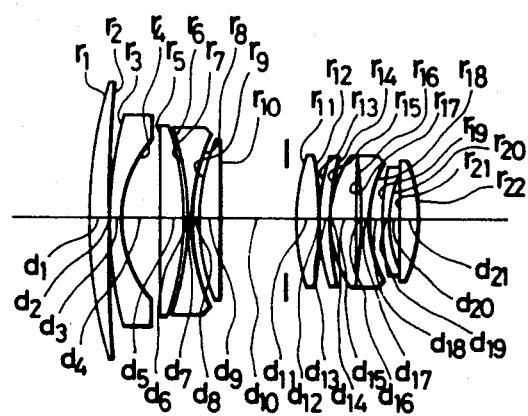
FIG. 1 shows a sectional view illustrating the composition of the zoom lens system according to the present invention.
Figure 2:
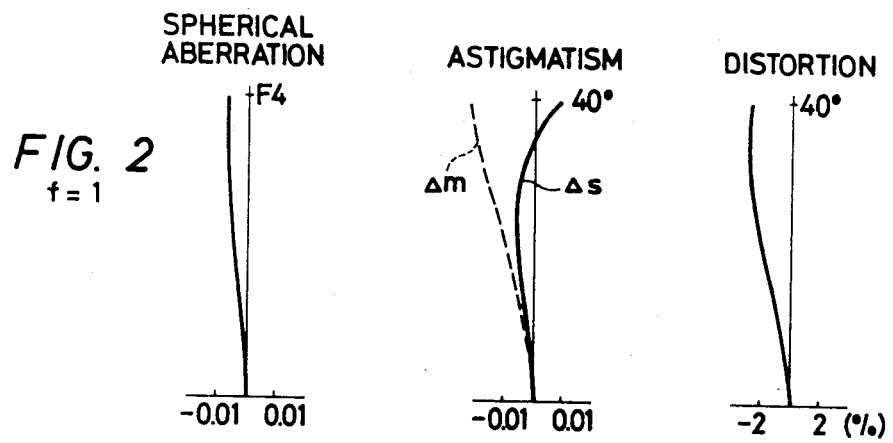
FIG. 2 through FIG. 4 show curves clarifying the aberration characteristics of a first embodiment of the present invention.
Figure 3:
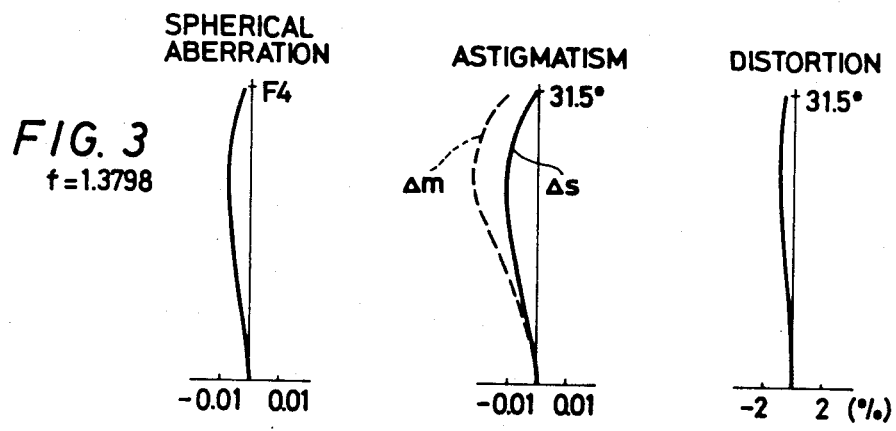
Figure 4:
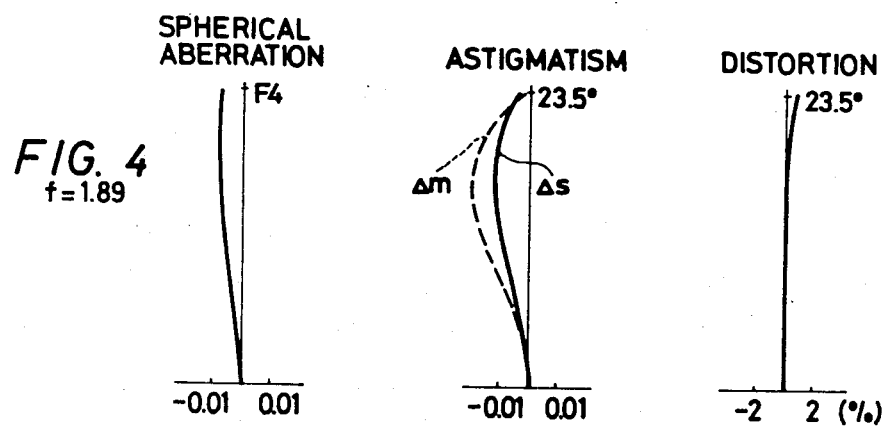

Now, numerical data for some preferred embodiments of the present invention will be described below:

Embodiment 1

$f=1\sim1.38\sim1.89$ F/4

$r_1=4.3907$
$\quad d_1=0.1357\ n_1=1.713\ \nu_1=53.9$
$r_2=19.4381$
$\quad d_2=0.0058$
$r_3=2.9023$
$\quad d_3=0.058\ n_2=1.713\ \nu_2=53.9$
$r_4=0.6866$
$\quad d_4=0.2907$
$r_5=-12.0756$
$\quad d_5=0.1163\ n_3=1.58215\ \nu_3=42.1$
$r_6=-2.1563$
$\quad d_6=0$
$r_7=-2.1563$
$\quad d_7=0.0465\ n_4=1.7352\ \nu_4=41.1$
$r_8=-1.3729$
$\quad d_8=0.0388$
$r_9=1.0842$
$\quad d_9=0.1938$
$r_{10}=-13.9953\ n_5=1.6727\ \nu_5=32.1$
$\quad d_{10}=1.146\sim0.5293\sim0.0903$
$r_{11}=2.0148$
$\quad d_{11}=0.1163\ n_6=1.62012\ \nu_6=49.7$
$r_{12}=-4.6387$
$\quad d_{12}=0.0047$
$r_{13}=1.1344$
$\quad d_{13}=0.0969\ n_7=1.61484\ \nu_7=51.2$
$r_{14}=2.1778$
$\quad d_{14}=0.0058$
$r_{15}=0.7755$
$\quad d_{15}=0.1821\ n_8=1.7352\ \nu_8=41.1$
$r_{16}=40.4356$
$\quad d_{16}=0.0155$
$r_{17}=-3.6114$
$\quad d_{17}=0.0465\ n_9=1.80518\ \nu_9=25.4$
$r_{18}=0.7740$
$\quad d_{18}=0.930$
$r_{19}=2.0574$
$\quad d_{19}=0.0388\ n_{10}=1.80518\ \nu_{10}=25.4$
$r_{20}=0.8597$
$\quad d_{20}=0.0775$
$r_{21}=17.1068$
$\quad d_{21}=0.1163\ n_{11}=1.62004\ \nu_{11}=36.3$
$r_{22}=-0.8979$
$f_1=7.925\ f_2=-1.275\ f_5=1.504$ $f_9 = -0.788$  $f_{10} = -1.861$  $f_{678} = 0.641$
$f_F = -1.725$  $f_R = 1.299$ Embodiment 2

$f = 1 \sim 1.37 \sim 1.88$ $r_1 = 3.3277$
  $d_1 = 0.1357$  $n_1 = 1.713$  $\nu_1 = 53.9$
$r_2 = 14.5781$
  $d_2 = 0.0058$
$r_3 = 3.1014$
  $d_3 = 0.0581$  $n_2 = 1.713$  $\nu_2 = 53.9$
$r_4 = 0.7204$
  $d_4 = 0.2829$
$r_5 = -17.4817$
  $d_5 = 0.1357$  $n_3 = 1.589$  $\nu_3 = 48.6$
$r_6 = -2.1000$
  $d_6 = 0.0388$
$r_7 = -1.8801$
  $d_7 = 0.0465$  $n_4 = 1.7352$  $\nu_4 = 41.1$
$r_8 = 1.4365$
  $d_8 = 0.0310$
$r_9 = 1.1545$
  $d_9 = 0.1357$  $n_5 = 1.71736$  $\nu_5 = 29.5$
$r_{10} = -40.5890$
  $d_{10} = 1.1943 \sim 0.5666 \sim 0.111$
$r_{11} = 2.3963$
  $d_{11} = 0.1163$  $n_6 = 1.62041$  $\nu_6 = 60.3$
$r_{12} = -7.0647$
  $d_{12} = 0.0047$
$r_{13} = 1.1393$
  $d_{13} = 0.0969$  $n_7 = 1.62041$  $\nu_7 = 60.3$
$r_{14} = 2.3038$
  $d_{14} = 0.0058$
$r_{15} = 0.7837$
  $d_{15} = 0.1744$  $n_8 = 1.7352$  $\nu_8 = 41.1$
$r_{16} = 7.5932$
  $d_{16} = 0.0388$
$r_{17} = -3.7026$
  $d_{17} = 0.0388$  $n_9 = 1.7847$  $\nu_9 = 26.2$
$r_{18} = 0.8025$
  $d_{18} = 0.0930$
$r_{19} = 2.1128$
  $d_{19} = 0.0388$  $n_{10} = 1.7847$  $\nu_{10} = 26.2$
$r_{20} = 0.9080$
  $d_{20} = 0.0775$
$r_{21} = 4.3097$
  $d_{21} = 0.1163$  $n_{11} = 1.65016$  $\nu_{11} = 39.4$
$r_{22} = -0.9599$
  $f_1 = 6.017$  $f_2 = -1.33$  $f_5 = 1.567$  $f_9 = -0.837$
  $f_{10} = -2.058$  $f_{678} = 0.704$  $f_F = -1.793$  $f_R = 1.3$ wherein the reference symbols $r_1$ through $r_{22}$ represent radii of curvature on the surfaces of the respective lens elements, the reference symbols $d_1$ through $d_{21}$ designate thicknesses of the respective lens elements and the respective airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $f_1$, $f_2$, $f_5$, $f_9$ and $f_{10}$ designate focal lengths of the first, second, fifth ninth and tenth lens elements respectively, the reference symbol $f_{678}$ denotes total focal length of the sixth, seventh and eighth lens elements as a whole, the reference symbol $f_F$ represents focal length of the front lens group as a whole, the reference symbol $f_R$ designates focal length of the rear lens group as a whole and the reference symbol f denotes focal length of the entire lens system as a whole.

In the embodiments described above, each of the numerical values is defined on an assumption that the focal length f of the entire lens system at its wide position is taken as standard or 1. In the Embodiment 1, $r_6$ is equal to $r_7$ and $d_6$ is equal to 0 since the third lens element is cemented to the fourth lens element.

As is understood from the foregoing descriptions and illustrations given in the drawings, the wide-angle zoom lens system according to the present invention has an aperture ratio of 4, an angle of field as large as 80° at the wide position, a short total length and a small effective diameter of the first lens element compatible with the ordinary type of filters having a diameter of 55 mm while featuring high performance to correct various aberrations very favorably.

I claim:

1. A wide-angle zoom lens system comprising a front lens group having negative refractive power, a rear lens group having positive refractive power and an aperture stop arranged between said front and rear lens groups, said front lens group comprising a first positive meniscus lens element having a convex surface on the object side, a second negative meniscus lens element having a strongly concave surface on the image side, a third positive meniscus lens element having a concave surface on the object side, a fourth biconcave lens element and a fifth biconvex lens element, and said rear lens group comprising a sixth biconvex lens element, a seventh positive meniscus lens element, an eighth positive meniscus lens element, a ninth biconcave lens element, a tenth negative meniscus lens element having a concave surface on the image side and an eleventh biconvex lens element, said lens system being so adapted as to change the focal length of the entire lens system as a whole by changing said airspace reserved between said front and rear lens groups and satisfy the conditions enumerated below:

$$2.5 < |f_1/f_F| < 5.0 \tag{1}$$

$$0.7 < |f_2/f_F| < 0.8 \tag{2}$$

$$0.8 < |f_5/f_F| < 0.95 \tag{3}$$

$$n_4 - n_3 > 0.13 \tag{4}$$

$$r_5 < 0 \tag{5}$$

$$0.4 < f_{678}/f_R < 0.6 \tag{6}$$

$$0.4 < |f_9/f_R| < 0.7 \tag{7}$$

$$1.3 < |f_{10}/f_R| < 1.7 \tag{8}$$

wherein the reference symbols $f_1$, $f_2$, $f_5$, $f_9$ and $f_{10}$ represent focal lengths of said first, second, fifth, ninth and tenth lens elements respectively, the reference symbol $f_{678}$ designates total focal length of said sixth, seventh and eighth lens elements as a whole, the reference symbol $f_F$ denotes focal length of said front lens group as a whole, the reference symbol $f_R$ represents total focal length of said rear lens group as a whole, the reference symbol $r_5$ designates radius of curvature on the object side surface of said third lens element, and the reference symbols $n_3$ and $n_4$ denote refractive indices of said third and fourth lens elements respectively.

2. A wide-angle zoom lens system according to claim 1 wherein said third lens element is cemented to said fourth lens element component, said lens system having the following numerical data:

$f = 1 \sim 1.38 \sim 1.89$   F/4

$r_1 = 4.3907$
 $d_1 = 0.1357$  $n_1 = 1.713$  $\nu_1 = 53.9$
$r_2 = 19.4381$
 $d_2 = 0.0058$
$r_3 = 2.9023$
 $d_3 = 0.058$  $n_2 = 1.713$  $\nu_2 = 53.9$
$r_4 = 0.6866$
 $d_4 = 0.2907$
$r_5 = -12.0756$
 $d_5 = 0.1163$  $n_3 = 1.58215$  $\nu_3 = 42.1$
$r_6 = -2.1563$
 $d_6 = 0$
$r_7 = -2.1563$
 $d_7 = 0.04645$  $n_4 = 1.7352$  $\nu_4 = 41.1$
$r_8 = 1.3729$
 $d_8 = 0.0388$
$r_9 = 1.0842$
 $d_9 = 0.1938$
$r_{10} = -13.9953$  $n_5 = 1.6727$  $\nu_5 = 32.1$
 $d_{10} = 1.146 \sim 0.5293 \sim 0.0903$
$r_{11} = 2.0148$
 $d_{11} = 0.1163$  $n_6 = 1.62012$  $\nu_6 = 49.7$
$r_{12} = -4.6387$
 $d_{12} = 0.0047$
$r_{13} = 1.1344$
 $d_{13} = 0.0969$  $n_7 = 1.61484$  $\nu_7 = 51.2$
$r_{14} = 2.1778$
 $d_{14} = 0.0058$
$r_{15} = 0.7755$
 $d_{15} = 0.1821$  $n_8 = 1.7352$  $\nu_8 = 41.1$
$r_{16} = 40.4356$
 $d_{16} = 0.0155$
$r_{17} = -3.6114$
 $d_{17} = 0.0465$  $n_9 = 1.80518$  $\nu_9 = 25.4$
$r_{18} = 0.7740$
 $d_{18} = 0.0930$
$r_{19} = 2.0574$
 $d_{19} = 0.0388$  $n_{10} = 1.80518$  $\nu_{10} = 25.4$
$r_{20} = 0.8597$
 $d_{20} = 0.0775$
$r_{21} = 17.1068$
 $d_{21} = 0.1163$  $n_{11} = 1.62004$  $\nu_{11} = 36.3$
$r_{22} = -0.8979$
 $f_1 = 7.925$  $f_2 = -1.275$  $f_5 = 1.504$  $f_9 = -0.788$
 $f_{10} = -1.861$  $f_{678} = 0.641$  $f_F = -1.725$  $f_R = 1.229$ wherein the reference symbols $r_1$ through $r_{22}$ represent radii of curvature on the surfaces of the respective lens elements, the reference symbols $d_1$ through $d_{21}$ designate thicknesses of the respective lens elements and the airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements and the reference symbol f designates focal length of the entire lens system as a whole.

3. A wide-angle zoom lens according to claim 1 having the following numerical data:

$f = 1 \sim 1.37 \sim 1.88$   F/4

$r_1 = 3.3277$
 $d_1 = 0.1357$  $n_1 = 1.713$  $\nu_1 = 53.9$
$r_2 = 14.5781$
 $d_2 = 0.0058$
$r_3 = 3.1014$
 $d_3 = 0.0581$  $n_2 = 1.713$  $\nu_2 = 53.9$
$r_4 = 0.7204$
 $d_4 = 0.2829$
$r_5 = -17.4817$
 $d_5 = 0.1357$  $n_3 = 1.589$  $\nu_3 = 48.6$
$r_6 = -2.1000$
 $d_6 = 0.0388$
$r_7 = -1.8801$
 $d_7 = 0.0465$  $n_4 = 1.7352$  $\nu_4 = 41.1$
$r_8 = 1.4365$
 $d_8 = 0.0310$
$r_9 = 1.1545$
 $d_9 = 0.1357$  $n_5 = 1.71736$  $\nu_5 = 29.5$
$r_{10} = -40.5890$
 $d_{10} = 1.1943 \sim 0.5666 \sim 0.111$
$r_{11} = 2.3963$
 $d_{11} = 0.1163$  $n_6 = 1.62041$  $\nu_6 = 60.3$
$r_{12} = -7.0647$
 $d_{12} = 0.0047$
$r_{13} = 1.1393$
 $d_{13} = 0.0969$  $n_7 = 1.62041$  $\nu_7 = 60.3$
$r_{14} = 2.3038$
 $d_{14} = 0.0058$
$r_{15} = 0.7837$
 $d_{15} = 0.1744$  $n_8 = 1.7352$  $\nu_8 = 41.1$
$r_{16} = 7.5932$
 $d_{16} = 0.0388$
$r_{17} = -3.7026$
 $d_{17} = 0.0388$  $n_9 = 1.7847$  $\nu_9 = 26.2$
$r_{18} = 0.8025$
 $d_{18} = 0.0930$
$r_{19} = 2.1128$
 $d_{19} = 0.0388$  $n_{10} = 1.7847$  $\nu_{10} = 26.2$
$r_{20} = 0.9080$
 $d_{20} = 0.0775$
$r_{21} = 4.3097$
 $d_{21} = 0.1163$  $n_{11} = 1.65016$  $\nu_{11} = 39.4$
$r_{22} = -0.9599$
 $f_1 = 6.017$  $f_2 = -1.33$  $f_5 = 1.567$  $f_9 = -0.837$
 $f_{10} = -2.058$  $f_{678} = 0.704$  $f_F = -1.793$  $f_R = 1.3$ wherein the reference symbols $r_1$ through $r_{22}$ represent radii of curvature on the surfaces of the respective lens elements, the reference symbols $d_1$ through $d_{21}$ designate thicknesses of the respective lens elements and the airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements and the reference symbol f designates total focal length of the entire lens system as a whole.

* * * * *